Jan. 2, 1934.  G. S. LANE  1,942,030
DISK BRAKE
Filed Oct. 28, 1930
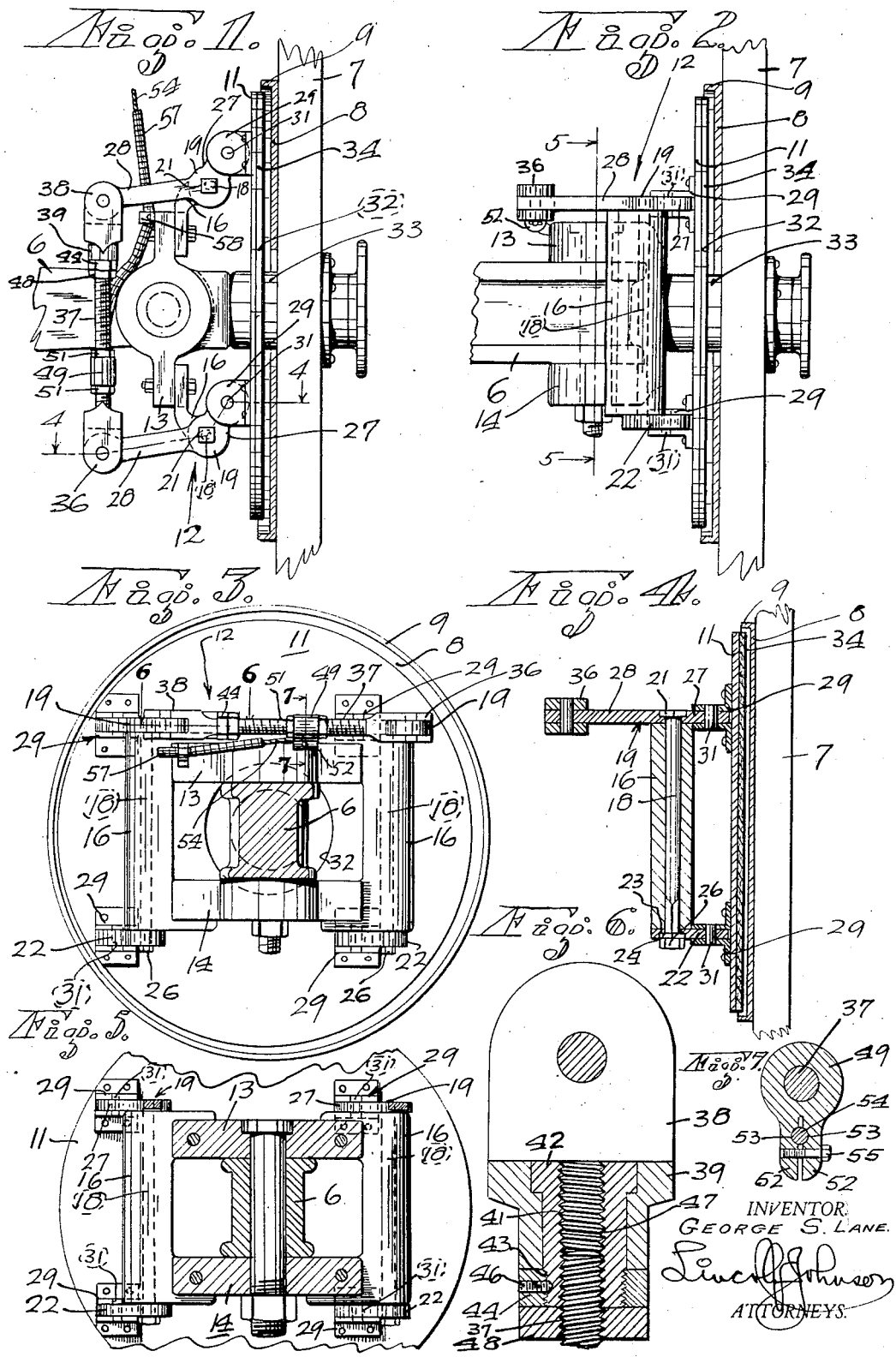
INVENTOR
GEORGE S. LANE.
ATTORNEYS Patented Jan. 2, 1934

1,942,030

UNITED STATES PATENT OFFICE 1,942,030

DISK BRAKE

George S. Lane, San Anselmo, Calif., assignor to Wallace Sheehan, San Francisco, Calif., as trustee Application October 28, 1930. Serial No. 491,698

5 Claims. (Cl. 188—72)

This invention relates to disk brakes.

An object of the invention is to provide a disk brake mechanism wherein a non-rotating brake disk is disposed at all times substantially in parallelism with a rotary, friction facing, and wherein the brake disk is offset relatively to the center of rotation of the friction disk, and the disks being brought into concentric relation to each other at the time when frictional engagement is established therebetween; in other words when the brake is inoperative the non-rotative and the rotative disks are eccentrically offset relatively to each other, and are brought into concentric alignment when the brake is applied; such arrangement permits the use of rocking supports for the brake disk, which turn around their respective fulcrums when the brake is applied; the rocking supports being adjustably connected for synchronized movement and for equalized pressure, and a brake actuating mechanism being adjustably associated with each brake to allow the synchronization of all the brakes on a vehicle or the like.

Other objects and advantages are to provide disk brakes that will be superior in point of simplicity, inexpensiveness of construction, positiveness of operation, and facility and convenience in use and general efficiency.

In this specification and the annexed drawing the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing wherein

Figure 1 is a plan view of the brake mechanism constructed in accordance with my invention; the wheel being partly broken away.

Figure 2 is a side view of the disk brake.

Figure 3 is a rear end view of the disk brake.

Figure 4 is a sectional view of the disk brake, the section being taken on the line 4—4 of Figure 1.

Figure 5 is a vertical, sectional view of the brake, the section being taken on the line 5—5 of Figure 2.

Figure 6 is a sectional view of the rocking lever connection, the section being taken on the line 6—6 of Figure 3; and Figure 7 is a sectional view of the connection between the brake actuating mechanism and the lever connection.

In carrying out my invention I make use of a stationary axle 6. When used in connection with the rear wheels of certain vehicles the axle housing or other similarly fixed element is utilized. A wheel 7 rotates on the axle 6.

On the inner face of the wheel is disposed a friction disk 8, provided with a peripheral, annular flange 9. Opposite the friction disk 8 is disposed a brake disk 11, which latter is supported on a rocking, brake operating mechanism, denoted in general by the numeral 12, the said mechanism in turn being mounted on the axle 6, so as to render the brake disk 11 non-rotative.

The brake disk supporting mechanism includes a support plate 13 on the top and another plate 14 on the bottom of the axle 6. The plates 13 and 14 are opposite each other and are preferably in horizontal position. On the ends of the plates 13 and 14 are fixed bearing brackets 16, one adjacent each side of the axle 6. The bearing brackets 16 are so disposed as to accommodate rocking shafts 18 therein in parallelism with the friction disk 8, and at right angles to the plates 13 and 14.

On the top end of each shaft 18 is secured a bell crank lever 19 by means of a rectangular shaft-head 21 fitting into a rectangular aperture in the lever 19. On the bottom end of each shaft 18 is a rocking arm 22. Each arm 22 has a rectangular recess 23 therein, into which fits a rectangular washer 24 held in place by a lock nut 26 threaded on the end of the shaft 18.

Each bell crank lever 19 has a rocking arm 27 thereof pivotally secured to the rear face of the brake disk 11. The rocking arms 22 are also pivotally attached to the rear face of the brake disk 11. Thus four points of support are provided for the disk 11. The longer arm 28 of each bell crank lever 19 extends at an oblique angle to the shorter arm 27. The respective shorter arms 27 and rocking arms 22 are parallel with each other. It is to be noted that each of the arms 22 and 27 is pivotally secured to the disk 11 by means of a double lug or yoke 29 and a pin 31.

In order to apply the brake the longer lever arms 28 are to be moved around the fulcrum of the lever so as to swing the shorter arms 27 and the rocking arms 22 in the direction of the friction disk 8. The outer ends of the arms 22 and 27 move both laterally and toward the disk 8, consequently the disk 11 is moved toward the friction disk 8 as well as across in front of the disk 8.

The disk 11 is so disposed that the center thereof is offset relatively to the center of rotation of the friction disk 8, so as to allow for the swinging movement of the arms 22 and 27. The eccentricity of the disk 11 relatively to the disk 8 is such that at the time the disk 11 is brought into contact with the friction disk 8, it is also moved toward the center of the disk 8 and into concentric position therewith. To permit such movement of the disk 11, the hole 32 in the center thereof is made larger than the diameter of the round portion 33 of the axle 6 at said disk 11.

It is to be noted that the spacing between the brake disk 11 and the friction disk 8 is so adjusted that axial advancement of the brake disk 11 toward the disk 8 is sufficiently long to allow the transverse movement of the disk 11 into concentric relation with the disk 8. The disks 8 and 11 are concentric at the time of their frictional engagement with each other. For the purpose of efficient brake friction a lining or facing 34 is provided on the face of the disk 11 opposite the friction disk 8. The facing 34 as well as the face of the disk 8 may be corrected in the manner described in my copending applications for friction brakes, Serial Number 377,314, filed July 10, 1929, and Serial Number 404,689, filed November 4, 1929.

The free ends of the longer arms 28 of the bell crank levers 19 are adjustably connected to each other to allow the equalization of the throw of the rocking arms 22 and 27 on both sides of the brake disk 11. On the free end of one of the arms 28 is pivoted a clevis 36, from which extends a threaded connecting bar 37 in the direction of the other arm 28. On the free end of the other arm 28 is pivoted a clevis 38. In the hub 39 of the clevis 38 is rotatably disposed a bushing 41, the head flange 42 of which is countersunk into the inner end of the hub 39. An externally threaded end 43 of the bushing 41 extends beyond the outer end of the hub 41 to receive a lock nut 44 thereon, which latter is secured in position by a setscrew 46. The bushing 41 is thus held against axial displacement by the said lock nut 44. The bushing is internally threaded at 47 to receive the end of the threaded rod 37 therein. A jam nut 48 on the rod 37 fixes the rod 37 in adjusted position. In order to adjust the relative angular position of the levers 19, the jam nut 48 is loosened, then by turning the nut 44 and the bushing 41 the clevis 38 is moved on the rod 37 toward or away from the other clevis 36, depending on the direction in which the bushing 41 is rotated.

On the rod 37 is disposed an internally threaded adjusting nut 49, held in adjusted position by locknuts 51 at the opposite ends thereof. From one side of the nut 49 extend opposed lugs 52, provided with complemental axial grooves 53 on the opposite inner faces thereof. The end of a brake operating cable 54 is inserted into the grooves 53. A bolt 55 slidably extends through the lug 52 adjacent the head of the bolt and is threaded into the other lug 52. The bolt 55 is disposed between the free ends of the lugs 52 and the grooves 53. By tightening the bolt 55 the cable 54 is securely held in the grooves 53. The cable 54 is disposed in a flexible jacket 57 which latter in turn is clamped at 58 to the plate 13. The cable 54 is connected to a brake pedal or the like in the customary manner. The tightness of the cable 54 can be readily adjusted by loosening the nuts 51 and adjusting the adjustment nut 49 to a desired position on the rod 37.

In this manner equalization of a plurality of simultaneously acting brakes can be readily accomplished.

In operation the brake disk 11 is always parallel with the friction disk 8, and it is adjusted into such parallel position by the shortening or lengthening of the space between the clevis 36 and the clevis 38 in the aforedescribed manner. In order to apply the brake, a pull is exerted on the cable 54 causing the rod 37 and the clevis 36 and 38 to move simultaneously. Thus the levers 19 are rocked, and all the arms 22 and 27 are turned in the direction of the friction disk 8. The brake disk 11 supported on the arms 22 and 27 is thus moved into concentric frictional engagement with the disk 8. The brake is released in the customary manner.

It will be recognized that a particularly facile brake mechanism is provided whereby a disk brake is effectively applied to resist the rotary movement of a wheel; in connection with automotive vehicles the brakes on all the wheels are readily synchronized and equalized by the aforementioned adjustments.

Having thus described this invention, what I claim and desire to secure by Letters Patent is:

1. In combination a stationary member, a rotating member associated with the stationary member; a friction disk related to the rotary member to rotate therewith; a brake disk operatively related to the friction disk; means associated with the stationary member to support said brake disk in an eccentric position relatively to the friction disk; said supporting means being adapted to move said brake disk into frictional engagement with the first disk so that the brake disk is in substantially coaxial, parallel relation to the rotary disk when engaged therewith; and brake actuating means adjustably connected to said supporting means to apply the brake.

2. In combination a stationary member, a rotating member associated with the stationary member; a friction disk related to the rotary member to rotate therewith; a brake disk operatively related to the friction disk; adjustable means associated with the stationary member to support said brake disk in an eccentric position relatively to the friction disk; said supporting means being adapted to move said brake disk into frictional engagement with the first disk so that the brake disk is in substantially coaxial, parallel relation to the rotary disk when engaged therewith; and brake actuating means connected to said supporting means to apply the brake.

3. In combination a stationary member, a rotating member associated with the stationary member; a friction disk related to the rotary member to rotate therewith; a brake disk operatively related to the friction disk; adjustable means associated with the stationary member to support said brake disk in an eccentric position relatively to the friction disk; said supporting means being adapted to move said brake disk into frictional engagement with the first disk so that the brake disk is in substantially coaxial, parallel relation to the rotary disk when engaged therewith; and brake actuating means adjustably connected to said supporting means to apply the brake.

4. The combination with a rotary element having a friction facing thereon, and a stationary member related to said rotary element; of a friction disk opposite said facing, means to nonrotatably support the disk in substantial parallelism with the facing and being adapted to move the disk into and out of engagement with said facing by moving the disk toward and away from said facing transversely across the axis of rotation of the said element, and means to actuate said supporting means.

5. The combination with a rotary element having a friction facing thereon, and a stationary member related to said rotary element; of a friction disk opposite said facing, means to non-rotatably support the disk in substantial parallelism with the facing and being adapted to move the disk toward and away from said facing transversely across the axis of rotation of the said element; and means to actuate said supporting means, said disk being initially so supported that its center is offset from the center of rotation of said element when the disk is inoperative, and is brought into concentric alignment with the said element and said facing when the brake is engaged.

GEORGE S. LANE.